US007690273B2

(12) United States Patent
Reber et al.

(10) Patent No.: US 7,690,273 B2
(45) Date of Patent: Apr. 6, 2010

(54) FORCE-MEASURING DEVICE AND REFERENCE UNIT

(75) Inventors: Daniel Reber, Madetswil (CH); Hans-Rudolf Burkhard, Wila (CH)

(73) Assignee: Mettler-Toledo AG, Greifensee (CH)

( * ) Notice: Subject to any disclaimer, the term of this patent is extended or adjusted under 35 U.S.C. 154(b) by 202 days.

(21) Appl. No.: 11/846,151

(22) Filed: Aug. 28, 2007

(65) Prior Publication Data

US 2008/0053249 A1   Mar. 6, 2008

(30) Foreign Application Priority Data

Sep. 5, 2006   (EP)   ................................. 06120100

(51) Int. Cl.
*G01L 1/12*   (2006.01)
(52) U.S. Cl. .................................................. 73/862.69
(58) Field of Classification Search ............... 73/862.69
See application file for complete search history.

(56) References Cited

U.S. PATENT DOCUMENTS

| 2,832,535 | A | * | 4/1958 | Sherman ..................... 177/31 |
| 3,786,883 | A | * | 1/1974 | Kunz ........................... 177/164 |
| 4,156,361 | A | * | 5/1979 | Melcher et al. .............. 73/1.13 |
| 4,212,361 | A | | 7/1980 | Stocker |
| 4,375,838 | A | * | 3/1983 | Yano et al. ................... 177/50 |
| 4,420,055 | A | * | 12/1983 | Grutzediek et al. ......... 177/212 |
| 4,553,618 | A | * | 11/1985 | Kusmenskji et al. ........ 177/185 |
| 4,624,331 | A | * | 11/1986 | Naito .......................... 177/185 |
| 4,926,359 | A | * | 5/1990 | Konishi et al. .............. 702/194 |
| 4,930,588 | A | * | 6/1990 | Kuhlmann et al. .......... 177/212 |
| 5,962,818 | A | * | 10/1999 | Komoto et al. .............. 177/229 |

(Continued)

FOREIGN PATENT DOCUMENTS

DE   33 24 402 A1   2/1984

(Continued)

OTHER PUBLICATIONS

"Build Your Quality on a Solid Foundation!", Company Publication, Mettler Toledo GmbH, Jan. 2001, pp. 2-28.

(Continued)

*Primary Examiner*—Lisa M Caputo
*Assistant Examiner*—Octavia Davis
(74) *Attorney, Agent, or Firm*—Buchanan Ingersoll & Rooney PC (57) ABSTRACT

The force-measuring device includes a measuring unit and a reference unit, the latter serving to deliver a reference quantity, a reference current ($I_{REF}$) or a reference voltage ($U_{REF}$), through which the force ($F_{MO}$) of a measurement object which is to be determined can be measured by the measuring unit. The reference unit is a force-measuring device which is loaded with a reference mass and which in accordance with the principle of electromagnetic force compensation generates a reference current ($I_{REF}$) that can be regulated through a measuring- and regulating device in such that in a first reference coil which is held by a reference lever, the reference current ($I_{REF}$) generates a magnetic field which cooperates with the magnetic field of a reference magnet. Through this cooperation a magnetic force is brought to bear on the reference lever. As a result, the force ($F_{REF}$) of the reference mass which is likewise acting on the reference lever can be compensated by said magnetic force.

19 Claims, 9 Drawing Sheets

U.S. PATENT DOCUMENTS

| | | | |
|---|---|---|---|
| 6,271,484 | B1 | 8/2001 | Takutsu |
| 7,315,003 | B2 * | 1/2008 | Maring ..................... 177/203 |
| 7,513,139 | B2 * | 4/2009 | Genoud et al. ............... 73/1.13 |
| 2004/0088342 | A1 | 5/2004 | Aikawa et al. |

FOREIGN PATENT DOCUMENTS

| | | |
|---|---|---|
| GB | 2 104 667 A | 3/1983 |
| GB | 2 257 793 A | 1/1993 |

OTHER PUBLICATIONS

"Wägefibel" (Weighing Primer), Mettler Toledo GmbH, Apr. 2001, pp. 2-20.

Tietze et al., "Halbleiter-schaltungstechink" (Semiconductor Circuit Design), 11$^{th}$ Edition, 2$^{d}$ Printing, Springer Verlag, Berlin 1999, pp. 1042-1062.

O'Grady., "Transducer/Sensor Excitation and Measurement Techniques" Analog Dialogue 34-5, 2000, pp. 1-6.

Esslinger et al., "Digital Power Amplification Based on Pulse-Width Modulation and Sigma-Delta Loops" Signal Processing Division, Dept. of Electronic and Electrical Engineering, University of Strathclyde, Glasgow G1 1XW, Scotland, 9 pages.

Kessling G. et al.: "A weighing device for use on a ship" Measurement Science and Technology, 5 IOP Publishing Ltd., vol. 3 4, No. 4., Oct. 10, 1993, pp. 2 1035-1042, XP000399915 Bristol.

European Search Report for EP 06 12 0100 dated Aug. 12, 2006.

* cited by examiner

FORCE-MEASURING DEVICE AND REFERENCE UNIT

RELATED APPLICATIONS

This application claims priority under 35 U.S.C. §119 to EP Application 06120100.0 filed in Europe on Sep. 5, 2006, the entire contents of which are hereby incorporated by reference in their entireties.

TECHNICAL FIELD

The disclosure relates to a force-measuring device, in particular a balance, as well as a reference unit.

BACKGROUND INFORMATION

The measurement accuracy of a force-measuring device, for example a balance based on electromagnetic force compensation or strain gauge technology (see [1], "Build your Quality on a Solid Foundation!", company publication, Mettler-Toledo GmbH, January 2001, pages 14-15) is influenced by many factors which are described in [2], "Wägefibel" (Weighing Primer), Mettler-Toledo GmbH, April 2001.

Balances of all types are particularly susceptible to disturbances caused by mechanical influences such as vibrations or shocks, and they are therefore equipped with filters which serve to remove the disturbance-related signal portions. Methods in which signals produced by the measurement transducer of a force-measuring device are processed by means of digital filters are described for example in [3], US 2004/0088342 A1 and [4], U.S. Pat. No. 6,271,484 B1. Force-measuring devices with very high levels of measurement resolution wherein a measurement quantity is registered and converted into a digital signal by means of an analog/digital (A/D) converter further require a very precise reference, a reference voltage or a reference current. A variety of A/D converters, all of which are supplied with a reference voltage $U_{REF}$, are presented in [5], U. Tietze, Ch. Schenk, "Halbleiterschaltungstechnik" (Semiconductor Circuit Design), $11^{th}$ edition, $2^d$ printing, Springer Verlag, Berlin 1999, pages 1043-1062. As can be easily understood for example from the so-called parallel method described in [5] on pages 1047-1048, the achievable resolution in the A/D conversion of an analog signal depends on the stability of the reference voltage $U_{REF}$.

Measuring bridge circuits of the type used in balances based on strain gauge technology are described in [6], Albert O'Grady, Transducer/Sensor excitation and Measurement Techniques, Analog Dialogue 34-5 (2000). As shown in FIG. 8 on page 4 of reference [6], the signals that are present at the center taps of the measuring bridge can be converted into a digital signal by means of a sigma-delta A/D converter, wherein the voltages which are applied to the measuring bridge circuit are supplied to the sigma-delta converter as reference voltages (in regard to the working principle of measuring bridges see also [5], pages 1241 and 1243).

While conventionally generated reference voltages are normally adequate for the levels of resolution achieved in balances that are based on strain gauge technology, force-measuring devices based on electromagnetic force compensation which can have significantly higher levels of resolution require reference voltages that have a higher stability and less noise. Particularly complex and expensive measures are required for example to suppress the so-called popcorn noise which is typically caused by semiconductors that have metallic impurities in the transition zones.

An electronic balance with electromagnetic force compensation is described for example in [7], DE 33 24 402. The electrical part of this balance includes a reference voltage source with a Zener diode which is a determinant factor for the measurement of the compensation current. The properties of the Zener diode are temperature-dependent, and a corrective circuit is therefore used to compensate the temperature-related influence factors. Thus, in balances based on electromagnetic force compensation that are used with a high measurement resolution, not only the noise characteristics but also the temperature-related behavior characteristics of the reference or the reference unit are of special importance.

SUMMARY

The present disclosure therefore has the objective to propose an improved force-measuring device as well as a reference unit by means of which the aforementioned problems are avoided. The aim is in particular to create a force-measuring device which has a relatively cost-effective reference unit that serves to deliver a suitable precise reference quantity, a reference current or a reference voltage.

The force-measuring device includes a measuring unit and a reference unit which serves to provide a reference quantity, a reference current or a reference voltage, by means of which the force to be determined which originates from a measurement object becomes measurable and/or a corresponding analog signal can be digitized.

The reference unit according to the invention is a force-measuring device which, when loaded with a reference mass, generates a reference current in accordance with the principle of electromagnetic force compensation. The magnitude of the reference current is controlled in such a way by a measuring- and regulating device that a magnetic field which is produced by the reference current in a first reference coil held by a reference lever and which interacts with the magnetic field of a reference magnet, e.g., a permanent magnet, generates a force acting on the reference lever whereby the force of the reference mass which acts likewise on the reference lever, either directly or through a lever-reduction mechanism, can be compensated.

The reference quantity generated by means of the reference unit contains only a small proportion of system-intrinsic disturbances and is therefore particularly well suited for applications in measuring instruments, in particular force-measuring devices of very high resolution. Besides avoiding system-intrinsic disturbances which occur in reference sources that are based on semiconductor technology, the disclosure has the additional advantage in the case of force-measuring devices that extraneous disturbances, which affect the measurement object and the reference mass practically in parallel phase, are automatically corrected, as not only the measuring signal of the force-measuring device but also the reference quantity changes in accordance with the disturbances acting on the force-measuring device. Thus, the respective changes which are caused by disturbances in the reference quantity and in the measuring signal are in a proportional relationship to each other.

Furthermore, the gravimetric reference unit according to the invention can be manufactured at a favorable cost in comparison to an electronic reference unit meeting comparable specifications.

The reference current generated by means of the reference unit can be converted into a reference voltage or into a digital quantity, depending on what is required in a given case.

The reference mass can be attached with a fixed connection to the reference lever, so as to avoid deviations of the lever moment that can occur as a result of a change in the position of the reference mass. Due to the absence of such deviations of the lever mechanism, a lever mechanism such as for example a parallelogram linkage is not an absolute requirement. The reference measuring unit can therefore be equipped with only a single lever, i.e. the reference lever, which carries the reference mass and the reference coil. An exemplary arrangement is where the reference mass is represented by the mass of the permanently installed reference coil and the mass of the reference lever itself. The mass of the reference coil exerts a downward pull on the reference lever while the magnetic field generated in the reference coil by means of the compensation current cooperates with the reference magnet and simultaneously exerts an upward push, so that the lever is kept in balance.

In principle, the reference lever of the reference unit can therefore be constrained at one end by a rotary fulcrum while the other end of the lever where the reference coil is attached is held above the reference magnet. However, this arrangement has the disadvantage that changes of the air pressure affect the reference signal. Therefore, in a further exemplary embodiment, a reference lever is used in which the volume portions to both sides of the lever pivot or fulcrum, including the volumes of one or more reference coils attached to the reference lever, compensate each other in regard to their respective air buoyancies. To compensate for the volume of the reference coil, the reference lever is therefore appropriately configured or equipped with a compensating air displacement body that is mounted on the opposite side of the reference lever at a suitable distance from the fulcrum. The forces caused by the air buoyancy acting to both sides of the fulcrum point are therefore at least approximately in balance with each other even under changing barometric pressure.

If the force-measuring device already has an unbalance in regard to buoyancy due to the configuration of the mechanism of the measuring unit, this unbalance of the buoyancy forces in the measuring unit can partially be compensated by compensating the volume of the reference coil. To allow reference units of the same build to be used in different force-measuring devices, the compensating air displacement body can be exchangeable for a different body, and/or the distance of the compensating air displacement body from the fulcrum point of the reference lever is adjustable.

The reference unit can be enclosed in a gastight enclosure in order to achieve the best possible protection from influence factors of the ambient environment.

With an encapsulated reference unit, the problems associated with air buoyancy can be solved in a simple way by evacuating the gas, in particular the air, from the gastight enclosure.

In a further exemplary embodiment of the reference unit, those signal portions of the regulated quantity which are in a frequency range above a lower limit which can be in the range from 10 Hz to 50 Hz are transmitted by way of a high-pass filter to a regulating unit which serves to control an amplifier, for example an impedance converter, which delivers a compensating current to a second reference coil that is attached to the reference lever, wherein the compensating current generates an magnetic field which interacts with the magnetic field of the reference magnet in such a way that disturbances of higher frequencies above the aforementioned lower limit can be corrected. Complex disturbances can therefore be corrected quickly by means of the second reference coil without compromising the compensation current in the first reference coil which serves as reference. The reference current therefore remains largely free of high-frequency disturbances.

In a further exemplary embodiment of the reference unit, the compensation current is transmitted by way of the second reference coil to one input of an integrator whose output is fed back to the input of the amplifier whereby a feedback loop is formed which always returns the output signal of the integrator to its original position. This is so because if there is a DC component flowing in the second reference coil, it will be integrated and returned to the input of the amplifier with the correct phase and consequently, a constant offset that may be present at the input of the amplifier will be compensated. This measure serves to ensure that only disturbance-related currents flow through the second reference coil. Thus, the current flowing in the first reference coil produces a compensation force which alone and by itself completely compensates the force of the reference mass.

The reference quantity generated by the reference unit can be used in different ways in a force-measuring device. For example, a reference voltage generated by the reference unit can be applied to a measuring bridge circuit in a measuring unit that operates according to the strain gauge principle.

In a measuring unit that operates according to the principle of magnetic force compensation, the reference current generated by the reference unit can be switched to flow alternatingly through a first and a second compensation coil attached to a compensation lever, that the result is a magnetic field which cooperates with the magnetic field of a permanent magnet system in such a way that a force acts by way of the compensation lever on an associated lever mechanism, whereby the force of the measurement object which is acting simultaneously on the lever mechanism is compensated.

From the reference voltage or the reference current delivered by the reference unit, it is further possible to derive a compensation current which flows through a reference coil, whereby the force of the load to be measured is compensated.

The reference voltage or the reference current generated in accordance with the invention can further serve as reference for an A/D converter that is incorporated in the measuring unit in an arrangement or the kind that is described for example in reference [5], pages 1043-1062. (See also reference [6], page 4, FIG. 8).

The lever systems of the measuring unit and the reference unit can be configured according to an integral design configuration in which the respective stationary parts of the measuring unit and the reference unit are joined and used together. For example, the measuring unit and the reference unit are realized by means of a monolithically constructed force-transmitting device in which the lever systems are incorporated. In order to obtain the most compact configuration possible for the force-measuring device, the at least one reference lever of the reference unit can be integrated into the stationary part of the parallelogram of the measuring unit. With this exemplary configuration and by using a monolithically configured force-measuring device which is formed through a spark-erosion process, it is possible to produce the reference unit with very little additional expense and to integrate the reference unit into the force-measuring device in a way that requires only a minimum of additional space.

A further exemplary configuration of the force-measuring device has a magnet system that is used in common for the measuring unit and the reference unit. This reduces first of all the cost, because a separate magnet becomes unnecessary. As a further advantage, the device can have an even more compact configuration. There are further advantages in regard to the temperature stabilization, which needs to be realized only in one magnet system. Furthermore, if temperature-related changes occur in the magnetic field of the magnet system, the respective effects of such changes on the measuring system and the reference system compensate each other.

The temperature of the magnet systems and/or of the coils of the measuring unit and/or the reference unit can be registered and used for the correction of the measurement values. Possible deviations of the reference quantity or the measurement results of the measuring unit which can be caused by temperature-related influences can thereby be compensated.

It is not a strict requirement for the reference unit to be joined together with the measuring unit. The reference unit can also be configured as a module. If it appears to be necessary, the modular reference unit can have at least one memory for the storage of data that are specific to the reference unit. For example correction data obtained in the final test or identification codes can be stored in this memory and recalled later by the processor unit of the force-measuring device.

The reference unit can further be miniaturized, for example as micro-electromechanical system (a so-called MEMS). A reference unit of such a miniaturized configuration can have an electrical and mechanical interface which can have the same dimensions and the same pin assignments as the semiconductor references which are offered in the form of integrated circuits by different suppliers. As described previously, such a fragile system can also be encapsulated in a gastight enclosure, and the hollow spaces inside the encapsulation can be evacuated.

The reference unit of the foregoing description can be used not only in force-measuring devices, but in all applications where precise, force-related reference units are needed. In particular for measuring instruments such as devices for measuring gravitational acceleration, accelerometers and the like, which are exposed to extraneous oscillations of the ambient environment, the reference unit of the present disclosure offers major advantages because such extraneous oscillations are likewise included in the reference quantity.

If the reference current is smoothed by means of analog or digital filters, the reference unit according to the invention can also be used in all other measuring instruments.

BRIEF DESCRIPTION OF THE DRAWINGS

The invention will hereinafter be explained in more detail with references to the drawings, wherein:

FIG. 2 schematically illustrates a reference unit 100R which operates according to the principle of electromagnetic force compensation and by means of which a reference current $I_{REF}$ is generated for a measuring unit 100, for example the circuit arrangement of FIG. 1a;

DETAILED DESCRIPTION

Figure 1:
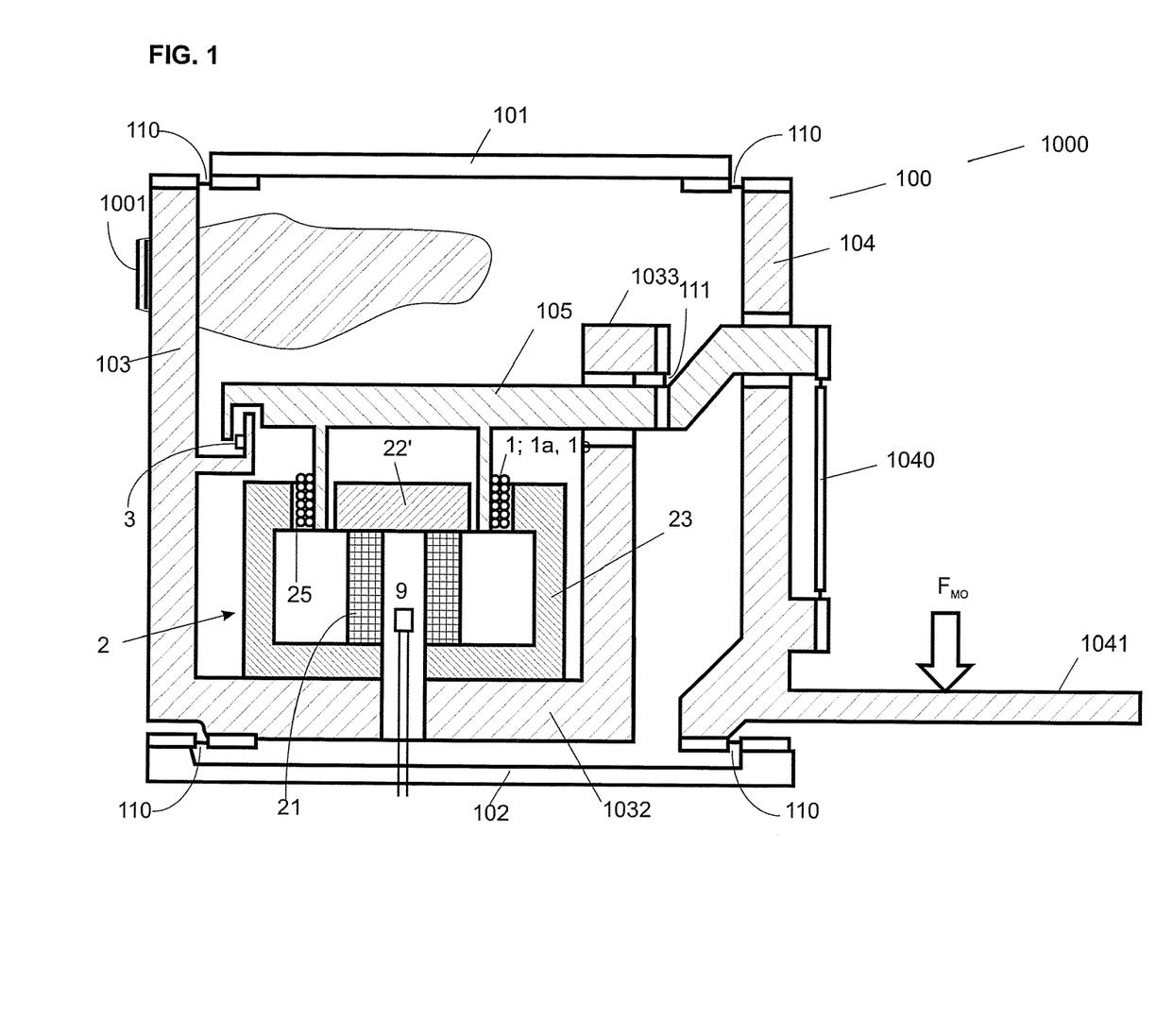
FIG. 1 represents a force-measuring device 1000 which operates according to the principle of electromagnetic force-compensation and which can be equipped with one compensation coil 1, or with two compensation coils 1a and 1b by means of which magnetic fields of opposite orientation can be generated in a push/pull mode of operation with a time offset.

FIG. 1 illustrates a balance 1000 operating in accordance with the principle of electromagnetic force compensation with a measuring unit 100, which can be equipped with one compensation coil 1, or with two compensation coils 1a, 1b serving to generate magnetic fields of opposite orientation with a time offset in a push/pull mode of operation.

The mechanical part of this balance 1000, which is represented schematically in FIG. 1, includes a stationary parallelogram leg 103 rigidly fastened to the balance housing 1001 and connected by means of two guide members 101 and 102 to a movable parallelogram leg 104 on which a cantilever arm 1041 is formed which serves to receive a load $F_{MO}$. The two parallelogram legs 103 and 104 are joined by flexing pivots 110 to the two guide members 101 and 102. Connected to a support arm 1032 extending from the stationary parallelogram leg 103 is a magnet system 2 which includes a permanent magnet 21 with a pole plate 22 positioned on top and with a cup-shaped field-guiding body 23 to close the loop of the magnetic flux lines. A coil 1 or, as an alternative, two coils 1a, 1b descend from above into the air gap 25 between the field-guiding body 23 and the pole plate 22. The coil 1 or, alternatively, the two coils 1a, 1b are fastened to a compensation lever 105 which by way of a coupling element 1040 transmits the normal component of the load $F_{MO}$. The compensation lever 105 is suspended by means of a flexing fulcrum pivot 111 from a column 1033 which is fastened to the support arm 1032 of the stationary parallelogram leg 103. The reference symbol 3 identifies an optical position sensor unit which serves to detect the excursions of the compensation lever 105 from its normal position.

The electrical part of the balance includes a corrective circuit with a temperature sensor 9 which exerts an influence on the load-dependent compensation current in such a way that the temperature dependence of the magnetic field strength of the magnet system is largely compensated.

A balance of this kind with only one compensation coil 1 is described for example in reference [7]. The electrical system of the balance described there includes a reference voltage source with a Zener diode which is the determinant element for the compensation current by means of which a force is generated which compensates the normal component of the load $F_{MO}$.

Figure 1A:
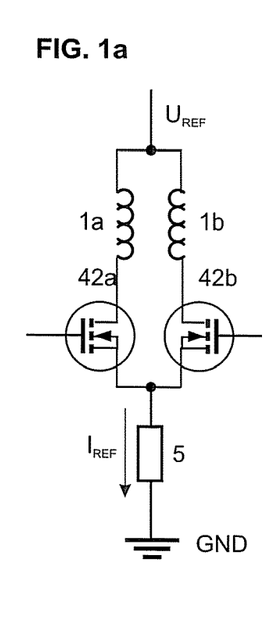
FIG. 1a illustrates the two compensation coils 1a, 1b with switching means 42a, 42b which serve to supply the reference coils 1a, 1b with mutually complementary components of a reference current $I_{REF}$ which are sigma/delta-modulated or pulsewidth-modulated in accordance with the magnitude of the load to be compensated.

Further known are force-measuring devices operating according to the principle of electromagnetic force compensation in which two compensation coils 1a, 1b (see FIG. 1a) are held by a compensation lever 105, wherein a reference current $I_{REF}$ is being switched to flow alternatingly through the two coils, with the result that a magnetic field is generated which cooperates with the magnetic field of the magnet system 2 in such a way that a force is brought to bear through the compensation lever 105 on the coupling element 1040, whereby the normal component of the load $F_{MO}$ is compensated. With this configuration of the force-measuring device or balance, the reference current $I_{REF}$ can likewise be generated by means of a Zener diode.

The drawbacks associated with generating a reference voltage or a reference current by means of a Zener diode or additional semiconductor components have been described above.

Figure 2:
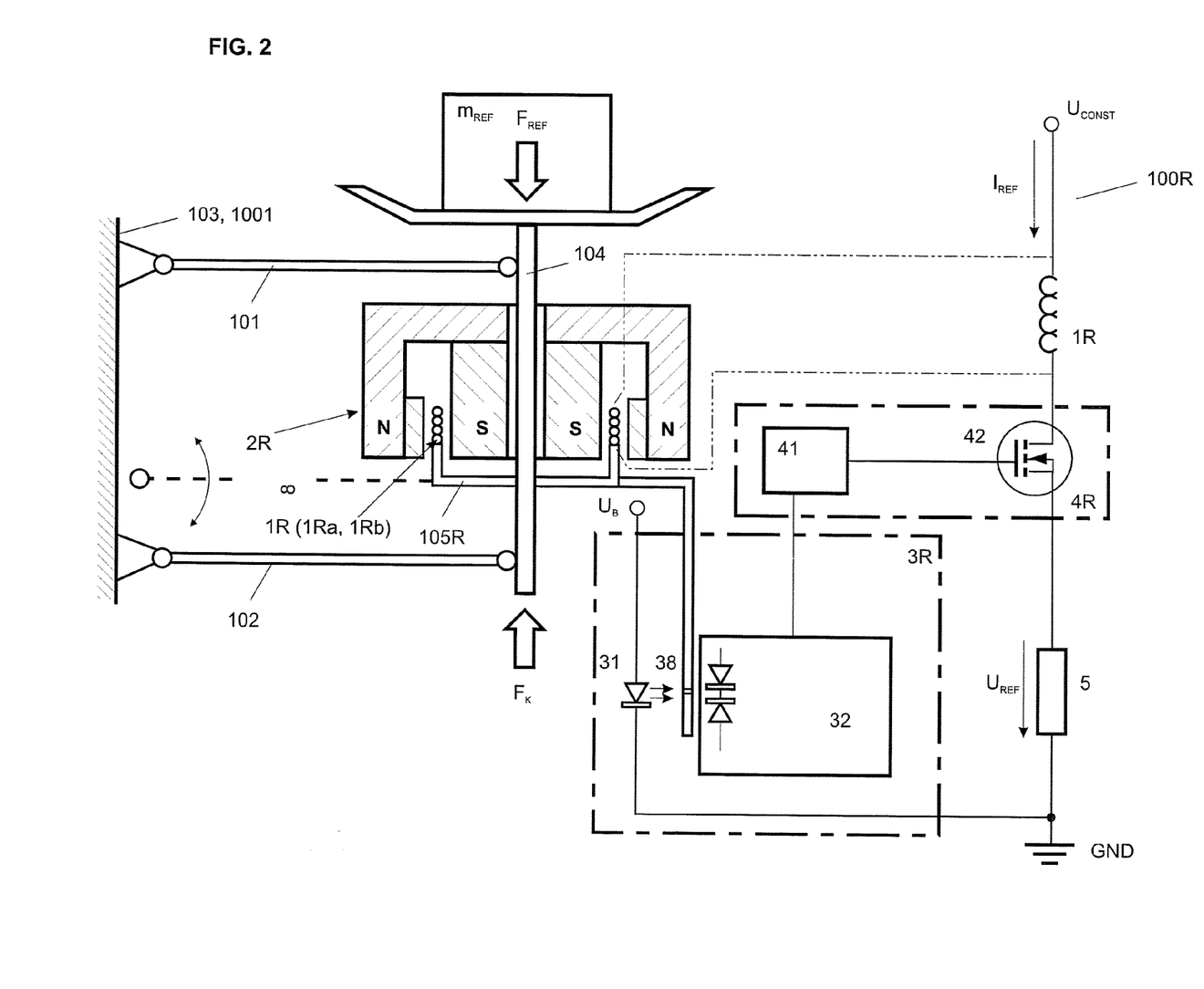

According to the invention, the reference current $I_{REF}$ and/or a reference voltage $U_{REF}$ which may be derived from it are generated by means of a reference unit 100R of the type illustrated in FIG. 2 in a simple configuration. The reference unit 100R is a force-measuring device carrying a reference mass $m_{REF}$, which generates the reference current $I_{REF}$ according to the principle of electromagnetic force compensation. The reference current $I_{REF}$ can be regulated by means of a sensor unit 3R and a regulating device 4R in such a way that in a first reference coil 1R held by a reference lever 105R a magnetic field is generated which cooperates with the magnetic field of a reference magnet 2R in such a way that a compensation force $F_K$ is brought to bear on the reference lever 105R, whereby the reference force $F_{REF}$ of the reference mass $m_{REF}$ which is likewise acting on the reference lever 105R is compensated. The reference mass $m_{REF}$ is held by means of a lever mechanism 101, 102, 103, 104, wherein the stationary lever 103 is formed by the housing 1001 of the force-measuring device, more specifically of the balance or of the stand-alone reference unit 100R. As shown in a schematic form of representation, the reference lever 105R is rotatably constrained by a virtual fulcrum located at an infinitely far distance, so that changes in the position of the reference mass on the weighing pan are irrelevant. As is further illustrated, the compensation force $F_K$ is oriented in the opposite axial direction of the reference force $F_{REF}$ and completely counterbalances the latter.

Excursions of the reference lever 105R from its normal position, typically in a range of 1 to 2 nanometers, are detected by means of the optical position sensor unit 3R. The optical position sensor unit 3R has a shutter vane 38 connected to the reference lever 105R and positioned between a light source 31 and a sensor unit 32 with light sensors, wherein the light from the light source 31 passes through an opening in the shutter vane 38 to reach the sensor unit 32. The sensor unit 32 which has two light sensors as indicated in FIG. 2 provides a feedback quantity to the regulating device 4. However, the sensor unit 32 can also have two other sensor units instead of two light sensors, for example photo-diode arrays, a PSD (position-sensitive device), a camera with image-processing and the like. The regulating device 4 includes a regulating component 41 for example with a PID characteristic, and a variably controllable resistance device 42, whereby the reference current $I_{REF}$ can be regulated in such a way that the reference lever 105R is always held in its normal position (also referred to as target position) in which the reference force $F_{REF}$ is completely compensated by the compensation force $F_K$. The path of the reference current $I_{REF}$ is routed to instrument ground GND through a reference resistor 5, on which the reference voltage $U_{REF}$ manifests itself as a result.

Figure 3:
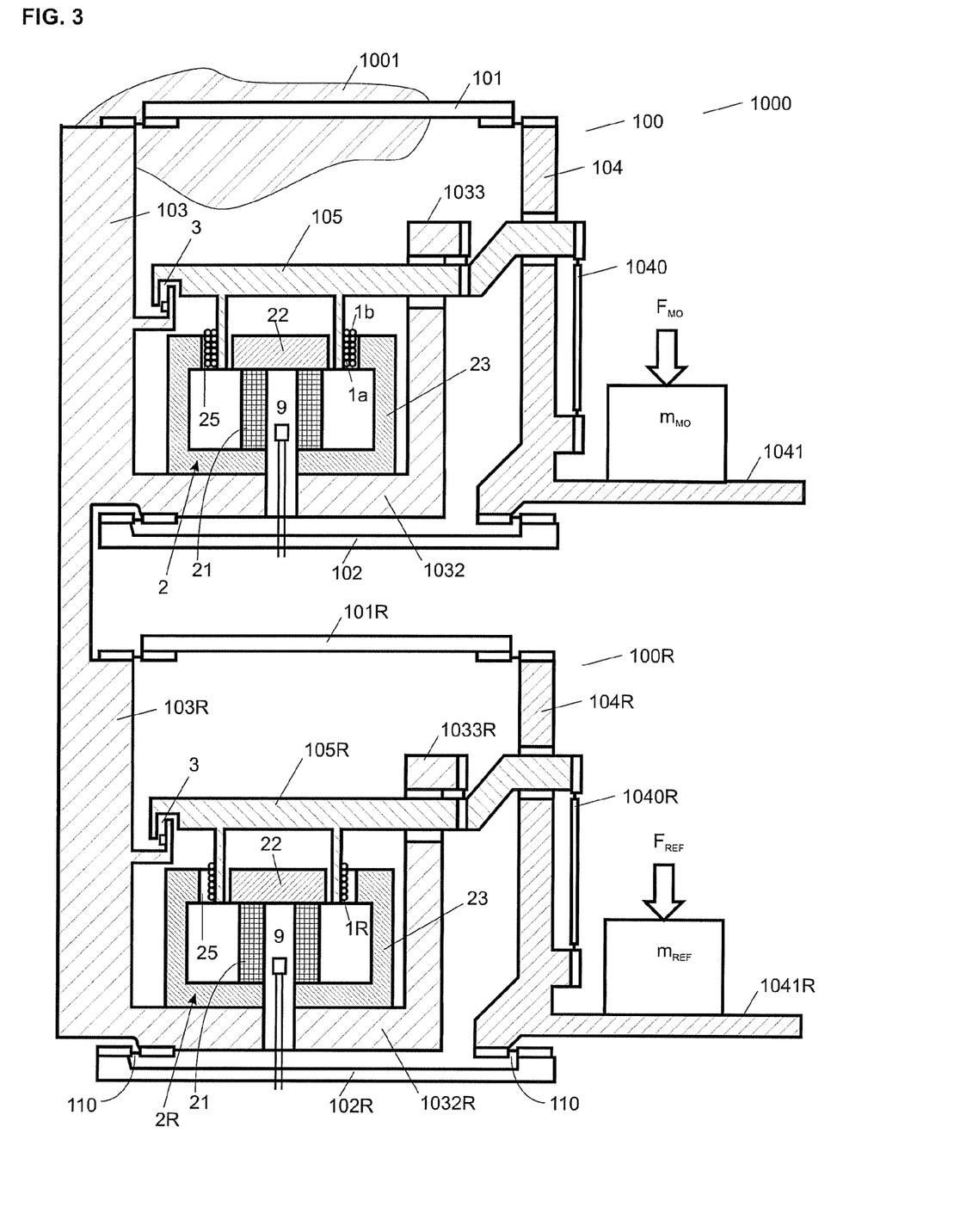
FIG. 3 illustrates an exemplary electromechanical system of a force-measuring device 1000, which includes are measuring unit 100 that functions according to the principle of electromagnetic force compensation, and a reference unit 100R of almost identical configuration which can be selectively loaded with different reference masses $m_{REF}$.

FIG. 3 illustrates a measuring unit 100a and an almost identically configured reference unit 100R, both operating according to the principle of electromagnetic force compensation as described above. The electrical and electronic parts of the measuring unit 100a and the reference unit 100R are analogous for example to the embodiment shown in FIG. 9. Both of the units 100 and 100R are equipped with a parallelogram consisting, respectively, of the elements 101, 102, 103, 104 and elements 101R, 102R, 103R and 104R, which has the function to transmit only the normal components of the load $m_{MO}$ and $m_{REF}$ to the respective coupling element 1040 or 1040R. A change of the position of the load $m_{MO}$ or $m_{REF}$ on the respective support arm 1041, 1041R has therefore no influence on the measurement. This relatively complex and expensive configuration of the reference unit 100R is used in cases where the reference mass $m_{REF}$ needs to be selectively interchangeable.

Figure 4:
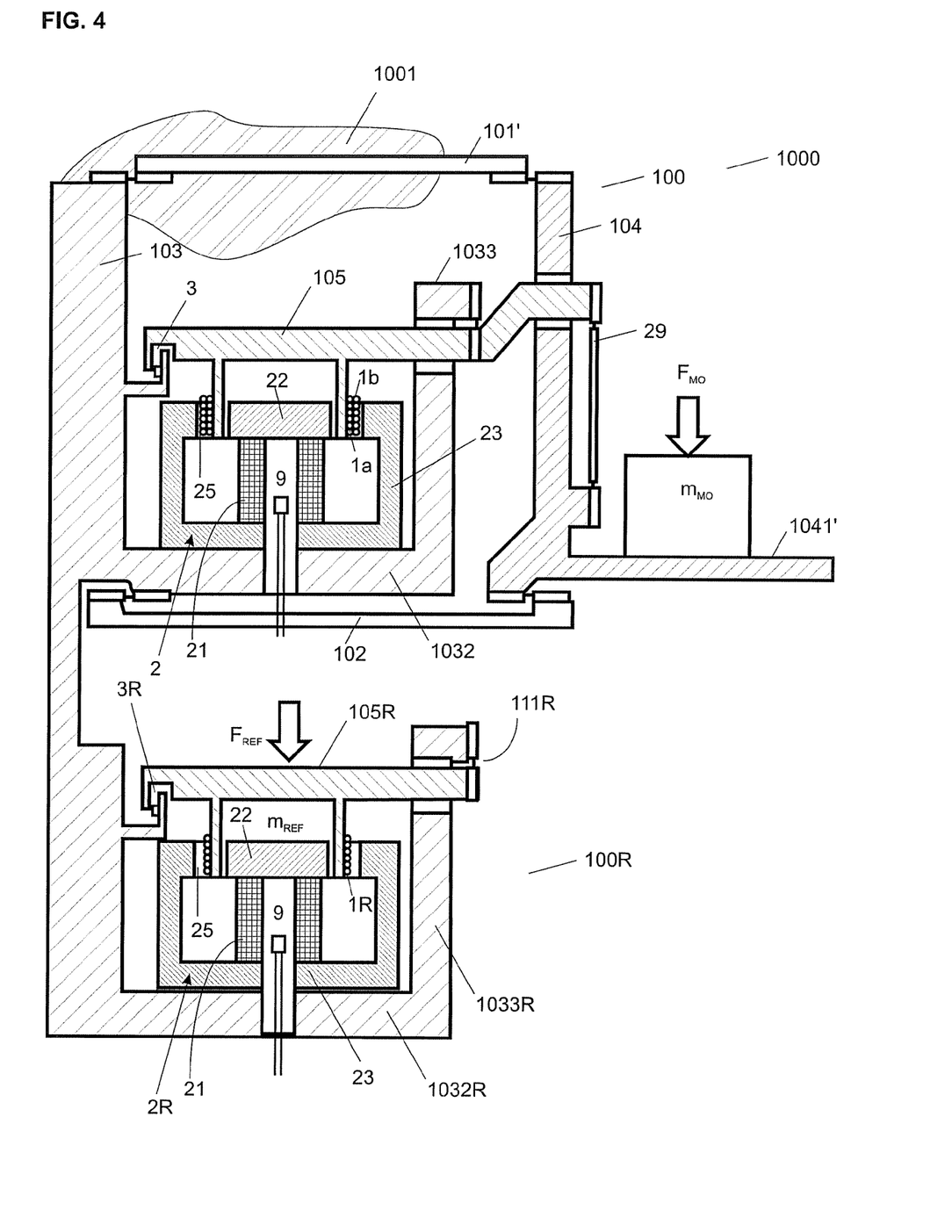
FIG. 4 shows the force-measuring device 1000 of FIG. 3 with a reference unit 100R of a simple configuration including instead of a lever mechanism only a reference lever 105R which carries at one end the reference coil 1R that serves at the same time as reference mass $m_{REF}$, and which is at its other end rotatably supported and thus subject to buoyancy forces that are dependent on barometric pressure.

FIG. 4 shows the force-measuring device 1000 of FIG. 3 with a reference unit 100R of a simpler configuration, which instead of a lever mechanism has only a reference lever 105R which carries at one end the reference coil 1R serving simultaneously as reference mass $m_{REF}$ and which is constrained at the other end by a fulcrum element 111R. Since the reference mass $m_{REF}$ in this embodiment is not intended to be interchangeable, the form and arrangement of the reference mass $m_{REF}$ are open to an arbitrary choice. Consequently, as shown in FIG. 4, the reference coil 1R itself is used as reference mass $m_{REF}$, whereby one obtains an extraordinarily simple configuration of the reference unit 100R. However, with this embodiment it needs to be noted that as a result of the air volume displaced by the reference lever 105R and the reference coil 1R, buoyancy forces will occur which are dependent on barometric pressure. A change of the barometric pressure causes a change of the downward force $F_{REF}$ acting on the reference lever 105R and simultaneously a change of the reference current $I_{REF}$ through which a magnetic field is generated which cooperates with the magnetic field of the reference magnet 2R. The force-measuring device 1000 of FIG. 4 therefore delivers optimal results if the air pressure is constant.

Figure 5:
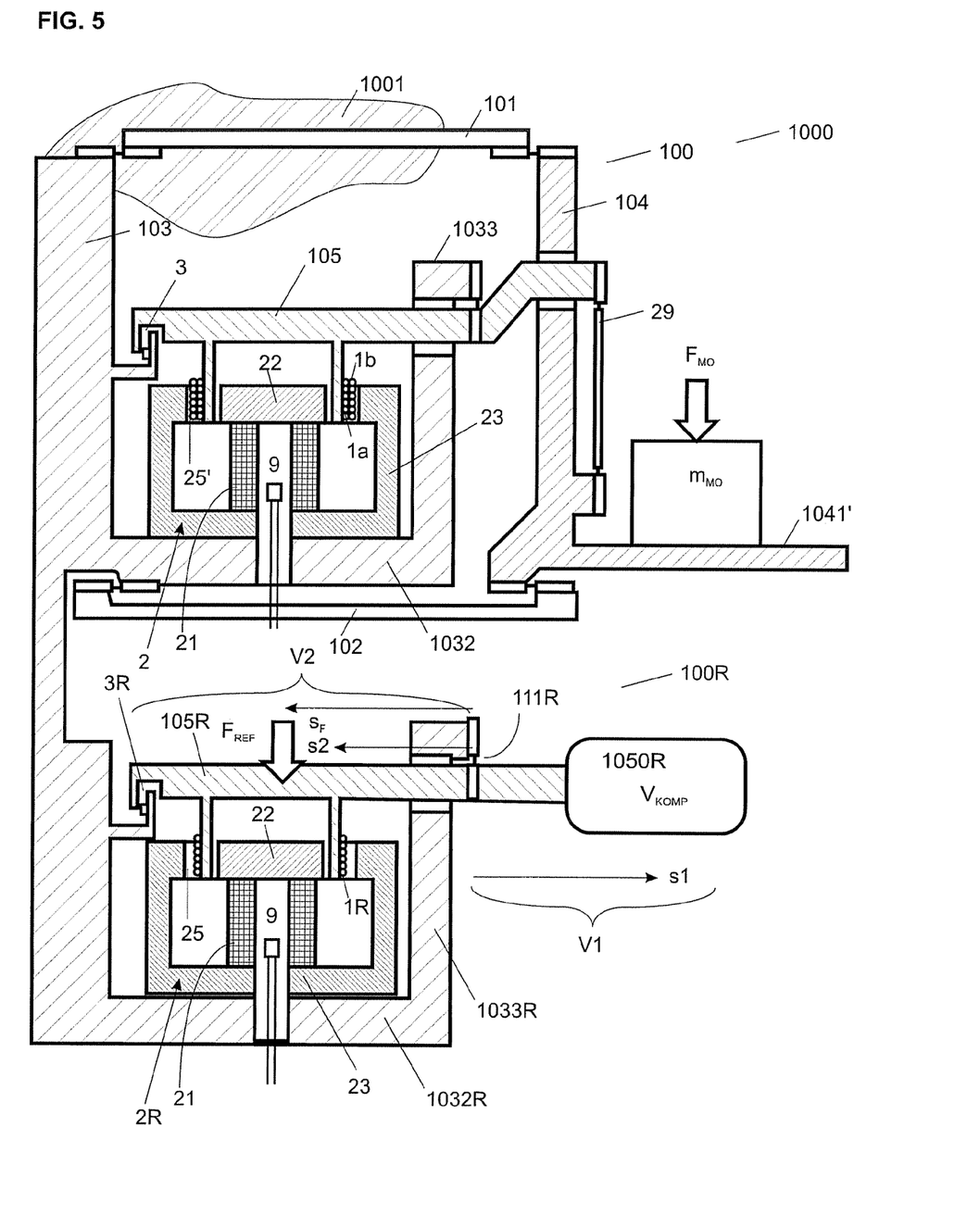
FIG. 5 shows the force-measuring device 1000 of FIG. 4 with a reference unit 100R according to an exemplary configuration with a reference lever 105R which carries the reference coil 1R serving as reference mass $m_{REF}$ to one side of the fulcrum point 111R and a compensating air displacement body to the other side of the fulcrum point 111R, for example an enclosed compensation vessel which serves to balance the volumes of the reference lever 105R and the parts connected to it on both sides of the fulcrum point 111R.

However, over longer time periods the barometric pressure fluctuates within a range of typically 40 hPA, i.e. about 4% of the nominal barometric pressure, at a given constant altitude above sea level. In the configuration of the reference unit 100R as shown in FIG. 5, the reference lever 105R is therefore equipped with a compensating air displacement body which can be configured so that the volume portions of the reference lever 105R on both sides of the fulcrum element 111R and thus the buoyancy forces acting on them will cancel each other as follows:

$$V1 \times s1 = V2 \times s2$$

V1 stands for the entire volume of the reference coil 1R and the reference lever 105R to one side of the fulcrum element 111R. The distance s1 is the distance of the center of gravity of the volume V1 from the fulcrum element 111R. V2 stands for the volume of the reference lever 105R to the other side of the fulcrum element 111R as well as the volume of the compensating air displacement body 1050R. The distance s2 is the distance of the corresponding center of gravity of the volume V2 from the fulcrum element 111R. The distance $s_F$ is the distance of the resultant reference force $F_{REF}$ from the center of rotation, i.e. from the fulcrum element 111R. The volumes V1 and V2 in this case represent the outside volumes of the reference lever 105R which are relevant for the air displacement.

If the equilibrium condition V1×s1=V2×s2 is met, the effect of the barometric pressure is compensated, because in the calculation of the buoyant forces to both sides of the fulcrum the air density $\rho_L$ and the gravitational acceleration g are entered on both sides of the equation ($\rho_L \times V1 \times g \times s1 = \rho_L \times V2 \times g \times s2$). The buoyancy forces therefore have no influence on the reference force $F_{REF}$.

However, the weight components of the reference lever 100R to either side of the fulcrum element 111R have different densities ρ1 and ρ2. The density ρ2 of the compensating displacement body 1050R and of the associated part of the reference lever 100R needs to be as small as possible in order to obtain the required reference force $F_{REF}$ on the side of the reference coil 1R at the distance $s_F$:

$$F_{REF} = (\rho 1 - \rho 2) \times V1 \times s1 \times g / s_F.$$

Furthermore, the rotary moments of inertia should be small. As the moments of inertia depend on the square of the distance from an axis of rotation, the distance s2 should be as short as possible, but as a consequence the compensating displacement body 1050R will need to have a commensurately bigger volume V2.

Figure 6:
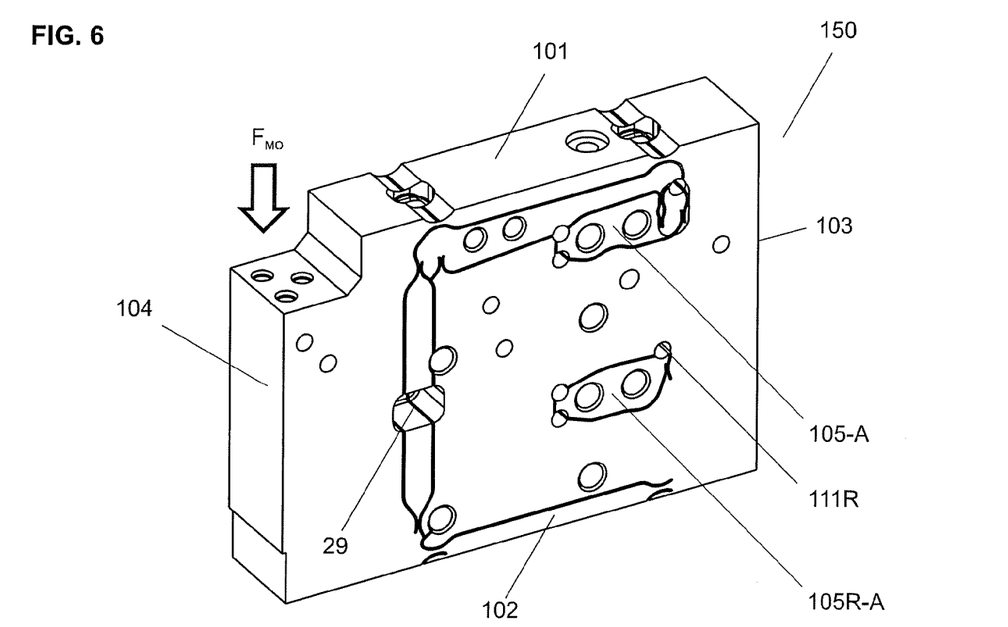
FIG. 6 illustrates a monolithically configured force-transmitting device 150 which is equipped with lever mechanisms for a measuring unit 100 and for a reference unit 100R.

Thus, there are numerous requirements that can be met in regard to the configuration of the measuring unit 100 and the reference unit 100R. These requirements can be satisfied in a particularly advantageous way by using a monolithically configured force-transmitting device, e.g., machined by means of a spark-erosion process from a solid body of metal, which serves for the shared use of both units 100 and 100R. A monolithically configured force-transmitting device 150 of this kind which allows a compact configuration for the measuring unit 100 and the reference unit 100R is illustrated in FIG. 6. The monolithically formed force-transmitting device 150 includes the elements 101, 102, 103, 104 of a parallelogram as shown in a schematic form of representation already in FIG. 2. A stationary parallelogram leg 103 is connected by means of two guide members 101 and 102 to a movable parallelogram leg 104 which will receive the force $F_{MO}$ of the measurement object that needs to be measured, and which is connected by way of a coupler element 29 to that part 105A of the compensation lever 105 which is arranged within the monolithically configured force-transmitting device 150. A part 105R-A of the reference lever 105R with the associated fulcrum element 111R is formed within the stationary parallelogram leg 103.

Figure 7:
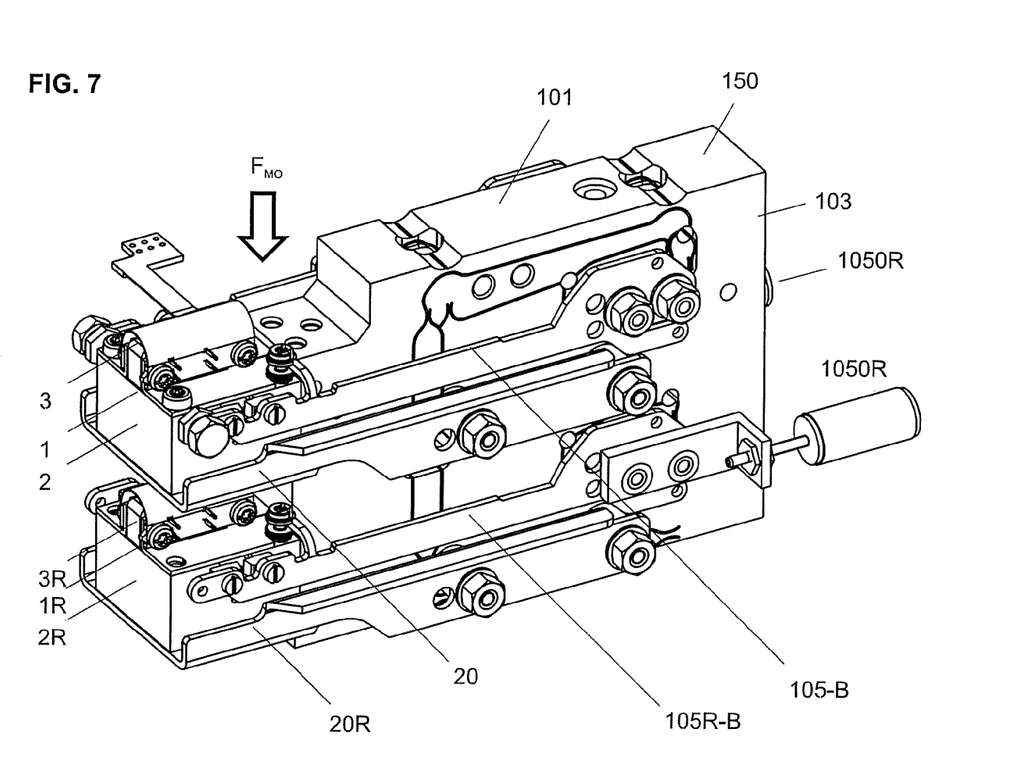
FIG. 7 shows the monolithically configured force-transmitting device 150 of FIG. 6, equipped with a compensation coil 1, a reference coil 1R, magnet systems 2, 2R, and optical position sensor units 3, 3R for the measuring unit 100 and the reference unit 100R, wherein the latter is in addition equipped with two compensating air displacement bodies 1050R.

FIG. 7 illustrates the monolithically configured force-transmitting device 150 of FIG. 6 equipped with a compensation coil 1, a reference coil 1R, magnet systems 2 and 2R, as well as optical sensor units 3, 3R for the measuring unit 100 and the reference unit 100R. The first parts 105-A and 105R-A of the compensation lever 105 and the reference lever 105R, i.e. the parts that are incorporated in the monolithically configured force-transmitting device 150, are connected to respective second parts 105-B and 105R-B of the compensation lever 105 and the reference lever 105R, which are configured in pairs and screwed onto the first parts from both sides of the monolithically configured force-transmitting device 150. The second parts 105-B and 105R-B hold the compensation coil 1 and the reference coil 1R positioned above their associated magnet systems 2, 2R which are supported, respectively, by cantilever arms 20 and 20R which are bolted to the monolithically configured force-transmitting device 150. Also shown are the position sensor units 3, 3R which serve to register the displacements of the levers 105, 105R. Further illustrated are two displacement-compensating bodies 1050R connected to a respective part of the reference lever 105R from both sides of the monolithically configured force-transmitting device 150.

Numerous other variations in configuration for the monolithically configured force-transmitting device 150 are within the scope of the disclosure. The magnet systems 2, 2R could for example be arranged on opposite sides. However, the present arrangement has the advantage that in case of mechanical disturbances, the measuring unit 100 and the reference unit 100R are affected in the same way, so that their responses to a disturbance cancel each other. Of course, it is also possible to use monolithically configured force-transmitting devices 150 which have reduction mechanisms with several levers. (The weighing cell shown in the drawing has two levers, but it is likewise possible to use only one lever or several levers).

With the use of a monolithically configured force-transmitting device it is also particularly simple to realize one or more reference units 103 which may produce several reference signals for a force-measuring device 1000 or for other measuring instruments.

Figure 8:
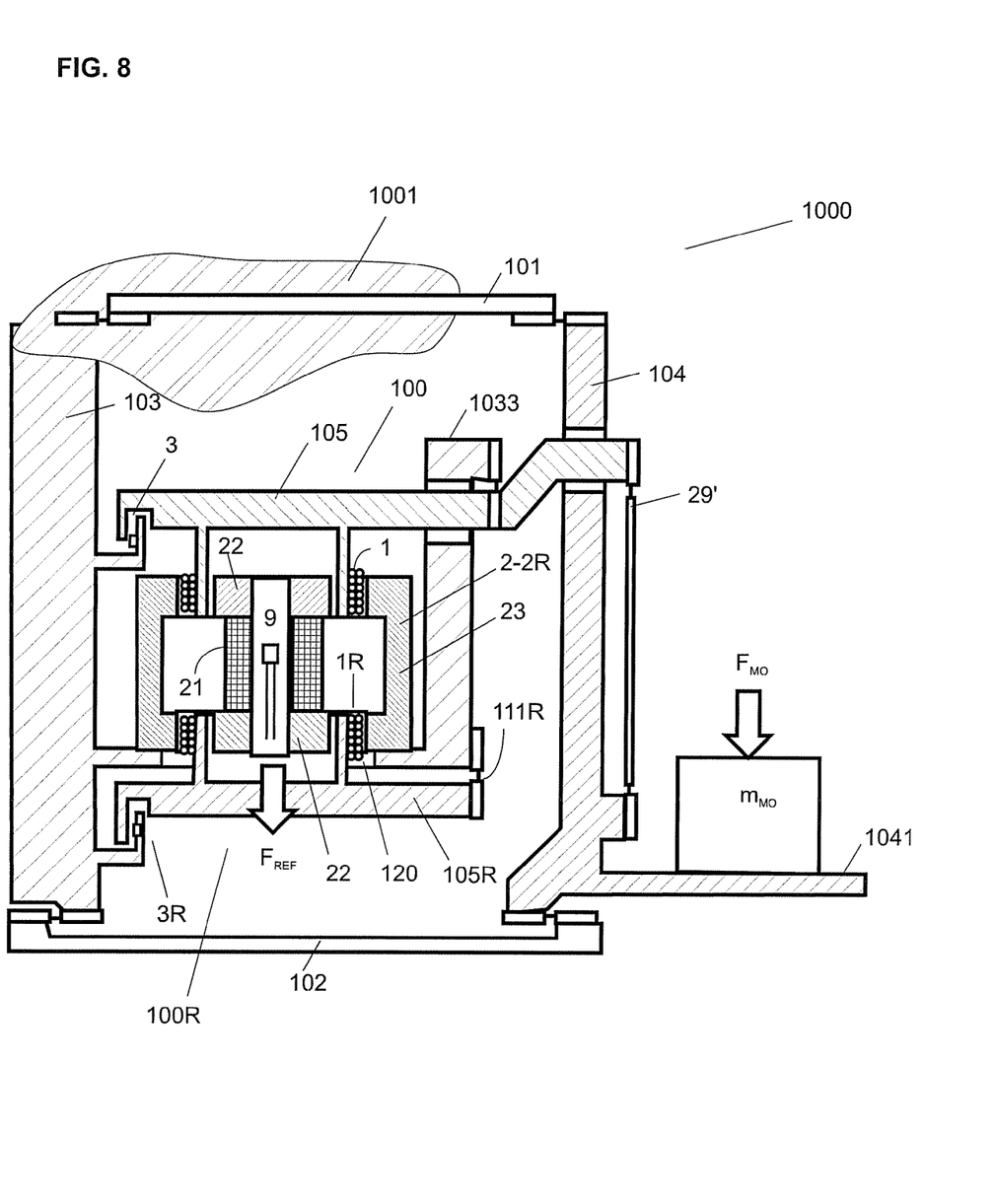
FIG. 8 shows a force-measuring device 1000 wherein a measuring unit 100 and a reference unit 100R share the use of a magnet system 2-2R.

FIG. 8 illustrates a force-measuring device 1000 with a measuring unit 100 and a reference unit 100R which share in the use of a magnet system 2-2R. This concept allows an even further simplified and more compact configuration of the device, for example in the case of the monolithically configured force-transmitting device 150 shown in FIG. 6. The magnet system 2-2R has on either side a ring-shaped air gap configured to receive the compensation coil 1 and the reference coil 1R, respectively. The support 1033 of the magnet system 2-2R is in this case equipped with an opening 120 to allow access for the reference coil 1R. In addition to the reduced cost, this exemplary embodiment has the particular advantage that a temperature compensation is needed only for one magnet system 2-2R. Furthermore, changes of the magnetic flux affect the measuring unit 100 and the reference unit 100R equally, so that in case of a change, the effects on the measuring unit and the reference unit cancel each other.

Figure 9:
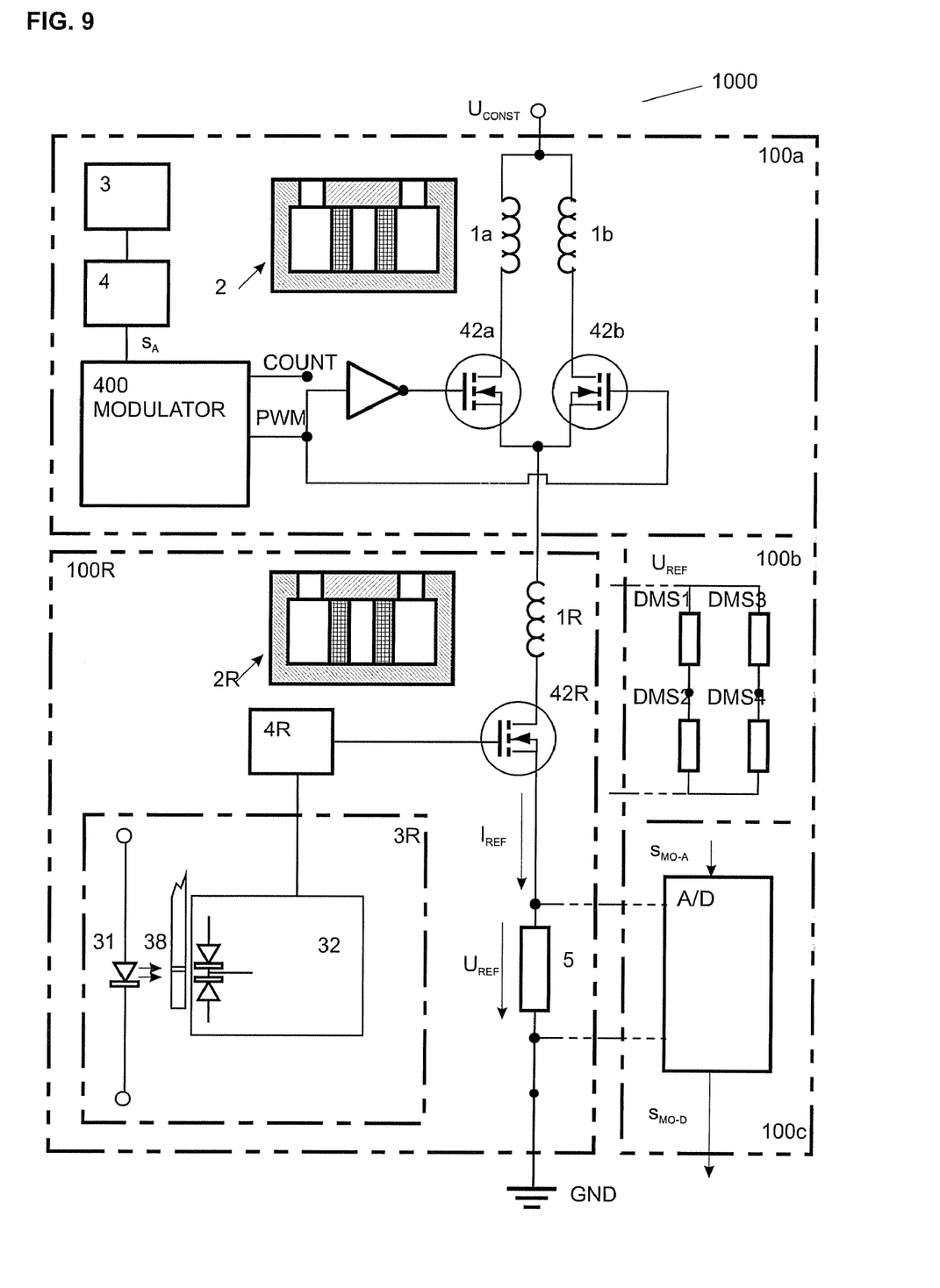
FIG. 9 shows the reference unit 100R, for example according to one of the FIGS. 2 to 8, which on the one hand generates a reference current $I_{REF}$ which is used as reference in a first measuring unit 100a operating according to the push/pull principle, and which on the other hand generates a reference voltage $U_{REF}$ that is used in a second measuring unit 100B as operating voltage for a measuring bridge and in a third measuring unit 100c as reference for an A/D converter.

FIG. 9 illustrates the reference unit 100R, for example according to FIG. 2,
a) with a first measuring unit 100a which is supplied with the reference current $I_{REF}$,
b) with a second measuring unit 100b, in which a reference voltage $U_{REF}$ is applied to a strain gauge bridge circuit, and
c) with a third measuring unit 100c in which the reference voltage $U_{REF}$ is delivered to an A/D converter.

The first measuring unit 100a operates according to the push/pull principle and includes a modulator 400 delivering a digital signal which is pulsewidth-modulated or modulated according to the sigma-delta (σ-δ) method. These two methods (PWM and σ-δ) are described for example in [8], R. Esslinger, G. Gruhler, R. W. Stewart, "Digital Power Amplification based on Pulse-Width Modulation and Sigma-Delta Loops", Signal Processing Division, Dept. of Electronic and Electrical Engineering, University of Strathclyde, Glasgow G1 1XW, Scotland.

Under the PWM method, an analog feedback signal $s_A$ delivered by the regulating unit 4 is converted into pairs of pulses that are complementary to each other, whose widths are regulated in accordance with the load to be compensated, adding up to a combined width of 1 for each pair. The pulses generated in this way serve to actuate the switches 42a and 42b. A width of 1 for the first pulse indicates that there is no load on the balance. If the widths of both pulses are equal, the balance is loaded to half of its capacity, and if the width of the second pulse equals 1, there is a full-capacity load on the balance. The magnitude of the load can thus be determined by a count of clock pulses over the width (i.e. the duration) of one of the pulses.

Under the σ-δ method an analog feedback signal $s_A$ delivered by the regulating unit 4 is converted into a sequence of pulses with values of 0 and 1, with the number of pulses being selectable, whose mean value is representative for the value of the analog feedback signal $s_A$. The ratio between the number of pulses with a value of 0 and a value of 1 thus indicates the amount of the load $F_{MO}$.

Figure 10:
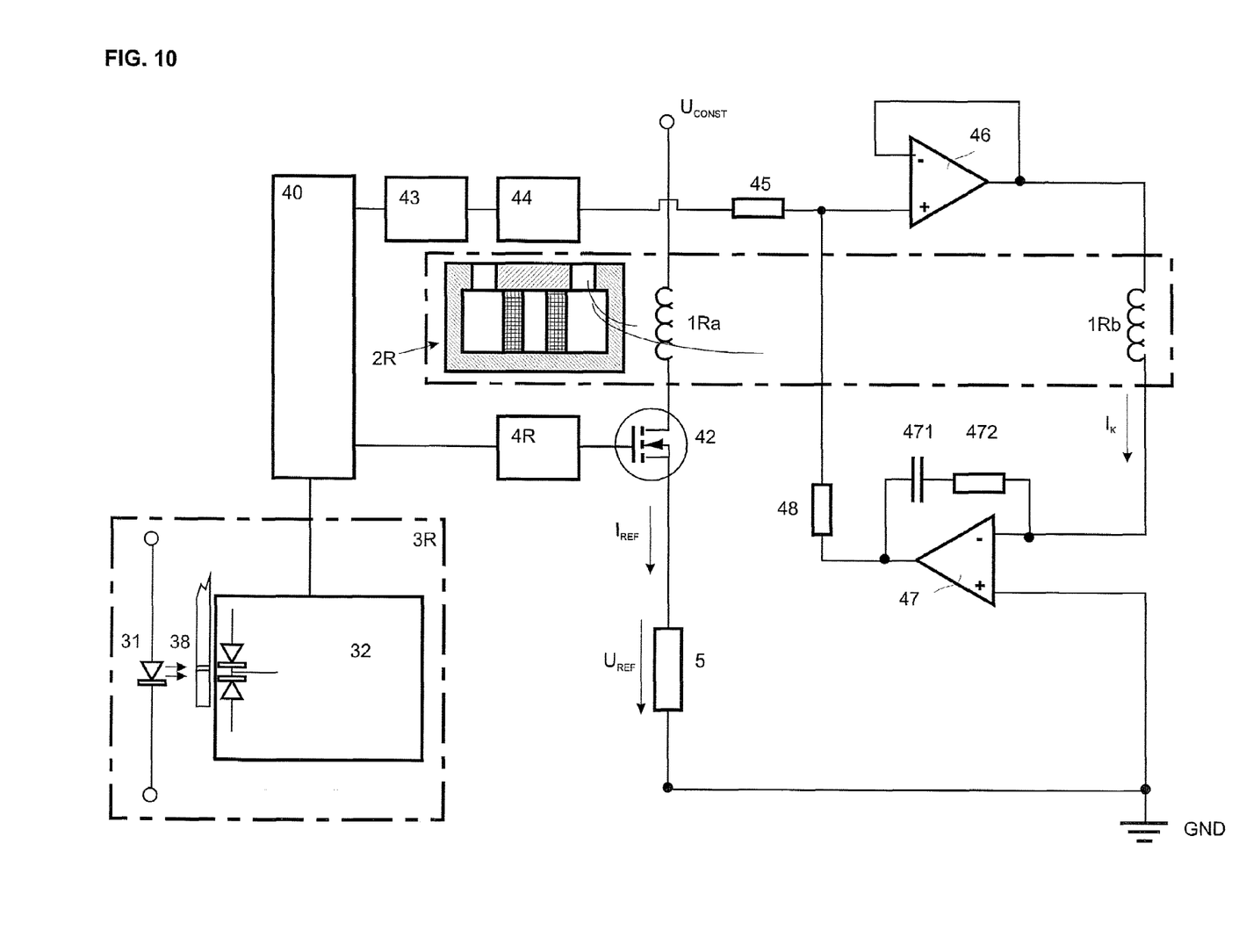
FIG. 10 shows a reference unit 100R according to one of the FIGS. 2 to 8 to which a second reference coil 1Rb and an associated servo feedback system has been added through which disturbances in the higher frequency range can be compensated without compromising the reference current $I_{REF}$ which flows through the first reference coil 1Ra.

In an exemplary configuration of the reference unit 100R which is illustrated in FIG. 10, signal components of the feedback quantity with frequencies above a lower limit which can be set in the range from 10 Hz to 50 Hz are directed by way of a high-pass filter 43 to a regulating unit 44 whose output signal is routed by way of a resistor 45 to the non-inverting input of an operational amplifier 46 which is arranged to function as an impedance converter. A commensurate compensation current $I_K$ is delivered by the operational amplifier 46 to a second reference coil 1Rb which is connected to the compensation lever 105R, wherein the compensation current $I_K$ generates a magnetic field which cooperates with the magnetic field of the reference magnet 2R in such a way that disturbances in the higher frequency ranges are corrected. The effects of extraneous disturbances can therefore be expeditiously corrected by means of the second reference coil 1Rb without thereby compromising the reference current $I_{REF}$ in the first reference coil 1Ra. The reference current $I_{REF}$ or the reference voltage $U_{REF}$ which may in some cases be derived from the reference current $I_{REF}$ therefore remains largely free of disturbances.

In order to avoid the possibility of drifts or deviations of the reference current $I_{REF}$ in the first reference coil 1Ra, the compensation current $I_K$ which is routed through the second reference coil 1Rb is directed to the inverting input of an integrator 47 whose output is returned by way of a resistor 48 to the non-inverting input of the operational amplifier 46, whereby a servo loop is set up which always returns the output signal of the integrator 47 to its original position. The integrator is configured as an operational amplifier 47 whose output is connected to its inverting input by way of a resistor 471 and a capacitor 472.

A resultant DC component flowing in the second reference coil 1Rb is therefore returned in integrated form and with the correct phase to the non-inverting input of the operational amplifier 47, whereby a constant offset which may be present at that location is compensated. This measure serves to ensure that the second reference coil R1b carries only currents that are associated with the extraneous high-frequency disturbances, but not those currents that serve for the force compensation.

The force-measuring device 1000 according to the invention, which can be used as a balance, has been described and illustrated in exemplary embodiments. However, reference units according to the invention can be used advantageously in conjunction with any other gravimetric measuring instruments or also with other measuring instruments.

The electromechanical configuration as well as the electronic circuit configuration of the reference unit 100R and the measuring unit 100 of the force-measuring device 1000 have been presented in part in a simplified form or through representative examples. However, the disclosed solution can be used with any desired configuration of the reference unit 100R and the measuring unit 100, in particular with lever mechanisms, measuring devices, magnet systems, coil systems and regulating systems of any desired configuration.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCES

[1]) "Build your Quality on a Solid Foundation!", company publication, Mettler Toledo GmbH, January 2001
[2] "Wägefibel" (Weighing Primer), Mettler Toledo GmbH, April 2001
[3] US 2004/0088342 A1
[4] U.S. Pat. No. 6,271,484 B1
[5] U. Tietze, Ch. Schenk, "Halbleiterschaltungstechnik" (Semiconductor Circuit Design), 11$^{th}$ edition, 2$^d$ printing, Springer Verlag, Berlin 1999
[6] Albert O'Grady, Transducer/Sensor Excitation and Measurement Techniques, Analog Dialogue 34-5 (2000)
[7] DE 33 24 402
[8] R. Esslinger, G. Gruhler, R. W. Stewart, "Digital Power Amplification based on Pulse-Width Modulation and Sigma-Delta Loops", Signal Processing Division, Dept. of Electronic and Electrical Engineering, University of Strathclyde, Glasgow G1 1XW, Scotland

What is claimed is:

1. A force-measuring device with a measuring unit, and further with a reference unit serving to deliver, a reference current ($I_{REF}$) by means of which the force ($F_{MO}$) of a measurement object which is to be determined can be measured by the measuring unit, wherein the reference unit is a force-measuring device which is loaded with a reference mass and which in accordance with the principle of electromagnetic force compensation generates the reference current ($I_{REF}$) that can be controlled by means of a measuring- and regulating device, so that in a first reference coil which is held by a reference lever the reference current ($I_{REF}$) generates a magnetic field which interacts with the magnetic field of a reference magnet in such a way that a magnetic force is brought to bear on the reference lever, wherein the force ($F_{REF}$) of the reference mass which is likewise acting on the reference lever can be compensated by said magnetic force.

2. The force-measuring device according to claim 1, wherein the reference current ($I_{REF}$) is routed through a reference resistor in order to generate a reference voltage ($U_{REF}$)

across said reference resistor or that the reference current ($I_{REF}$) is converted and used as a digital reference quantity.

3. The force-measuring device according to claim 1, wherein the actual momentary position of the reference lever can be measured by means of an optical position sensor unit which serves to deliver a corresponding feedback quantity based on which the reference current ($I_{REF}$) flowing through the regulating device can be controlled in such a way that the reference lever is always returned to a target position.

4. The force-measuring device according to claim 1, wherein signal components of a feedback quantity whose frequency exceeds a given value in the range from 10 Hz to 50 Hz, can be sent by way of a high-pass filter to a regulating unit by means of which an amplifier can be controlled to send a corresponding compensation current ($I_K$) to a second reference coil which is connected to the reference lever, wherein the compensation current ($I_K$) generates a magnetic field which cooperates with the magnetic field of the reference magnet in such a way that the effects of disturbances in the higher frequency ranges can be corrected.

5. The force-measuring device according to claim 4, wherein the compensation current ($I_K$) can be directed by way of the second reference coil to an input of an integrator whose output is returned to the input of the amplifier, whereby a feedback loop is established which always returns the output signal of the integrator to the starting position.

6. The force-measuring device according to claim 1, wherein
in the measuring unit which operates according to the strain gauge principle, the reference voltage ($U_{REF}$) generated by the reference unit is applied to a measuring bridge circuit, or
in the measuring unit which operates according to the principle of magnetic force compensation, the reference current ($I_{REF}$) generated by the reference unit is switched to flow alternatingly through a first and a second compensation coil held by a compensation lever, so that the result is a magnetic field which cooperates with the magnetic field of an associated magnet system in such a way that a force acts on an associated lever mechanism through the compensation lever, whereby the force ($F_{MO}$) of the measurement object which is likewise acting on the lever mechanism can be compensated by the measuring unit, or
the required compensation current is derived from the reference voltage ($U_{REF}$) or from the reference current ($I_{REF}$), or
the measuring unit comprises an A/D converter capable of receiving and using the reference voltage ($U_{REF}$) or the reference current ($I_{REF}$) as reference quantity by means of which the measured signals ($S_{MO}$) of the measurement object can be digitized.

7. The force-measuring device according to claim 1, wherein the reference lever is connected by means of a fulcrum element to the stationary part of the lever mechanism of the measuring unit or that the reference lever and the lever mechanism of the measuring unit are incorporated at least in part in a monolithically configured force-transmitting mechanism, or that only the reference unit is realized by means of a monolithically configured force-transmitting device.

8. The force-measuring device according to claim 1, wherein a magnet system is provided for the shared use of the measuring unit and the reference unit, wherein the magnetic field on one side of said magnet system cooperates with the magnetic field of the compensation coil and on the other side of the magnet system with the magnetic field of the reference coil.

9. The force-measuring device according to claim 1, wherein the reference coil and, where appropriate parts of the reference lever, form the reference mass.

10. The force-measuring device according to claim 1, wherein the volume of the reference coil and of the part of the reference lever that lies on one side of the fulcrum element is compensated in such a way by the volume of at least one compensating displacement body and of the part of the reference lever on the other side of the fulcrum element that when the distances of the centers of gravity from the fulcrum are taken into account, the buoyancy forces occurring on either side are approximately in balance with each other even with changes in the barometric pressure.

11. The force-measuring device according to claim 10, wherein at least one of the at least one compensating displacement body is exchangeable and the distance of the displacement body from the fulcrum element is adjustable.

12. The force-measuring device according to claim 11, wherein the reference unit is arranged in a gastight enclosure.

13. The force-measuring device according to claim 10, wherein the gastight enclosure is evacuated.

14. The force-measuring device according to claim 13, wherein at least one of the temperature of the magnet systems and of the coils of the measuring unit and of the reference unit can be measured and used for correcting measurement values.

15. The force-measuring device according to claim 1, wherein the reference unit is arranged in a gastight enclosure.

16. The force-measuring device according to claim 1, wherein at least one of the temperature of the magnet systems and of the coils of the measuring unit and of the reference unit can be measured and used for correcting measurement values.

17. A reference unit, operable to generate a reference current ($I_{REF}$) corresponding to a reference mass, wherein a measuring- and regulating device is provided by means of which the reference current ($I_{REF}$) can be regulated in such a way that in a first reference coil held by a reference lever a magnetic field is generated which interacts with the magnet field of a reference magnet in such a way that a force is brought to bear on the reference lever, whereby the reference force ($F_{REF}$) of the reference mass which is likewise acting on the reference lever can be compensated,
wherein the reference unit comprises at least one memory for at least one of specific data of the reference unit and an identification code.

18. The reference unit according to claim 17, wherein the reference unit comprises an electrical and mechanical interface.

19. The reference unit according to claim 17, wherein the reference unit is implemented as a micro-electromechanical system.

* * * * *